Nov. 11, 1941.   H. M. STEPHENS   2,262,592
MINING CUTTER BIT
Filed Dec. 30, 1940

Henry M. Stephens
INVENTOR.
BY Clarence E. Threedy
HIS ATTORNEY.

Patented Nov. 11, 1941

2,262,592

UNITED STATES PATENT OFFICE 2,262,592

MINING CUTTER BIT

Henry M. Stephens, Montgomery, W. Va.

Application December 30, 1940, Serial No. 372,235

2 Claims. (Cl. 262—33)

This invention relates to bit holders and particularly to a mining cutter bit used in connection with the mining of coal and ore or the like, or in such places as require the use of a bit of the type for cutting through a material, and has for its principal object the provision of an improved construction of this character which is highly efficient in use and economical in manufacture.

The present invention relates to an improvement over that shown in my companion application filed on even date hereof Serial No. 372,233.

Among the salient objects of this invention is the provision of an effective and inexpensive arrangement for releasably holding and wedging the bit to its chuck.

Heretofore in the employment of mining cutter bits of the type hereinafter described, due to the lack of firmness in holding the bit in place, a vibratory action would be transmitted to the bit, ultimately resulting in crystallization of the shank thereof and the breakage or dislodgement of the bit from its chuck or holder. In many instances in bits of the type hereinafter set forth, by virtue of the particular and special means adapted for holding the bit in its place upon the chuck, either the chuck or the shank of the bit, in order to make room for the attachment, was greatly weakened and often weakened to the point where, when the bit was subjected to rough usage, breakage at the line of weakened union occurred.

It is therefore one of the many objects of this invention to provide a bit which is attached to the chuck holder in a manner such as will prevent these known disadvantages.

Other objects will appear hereinafter.

The invention consists in the novel combination and arrangement of parts to be hereinafter described and claimed.

The invention will be best understood by reference to the accompanying drawing showing the preferred form of construction, and in which.

Figure 1:
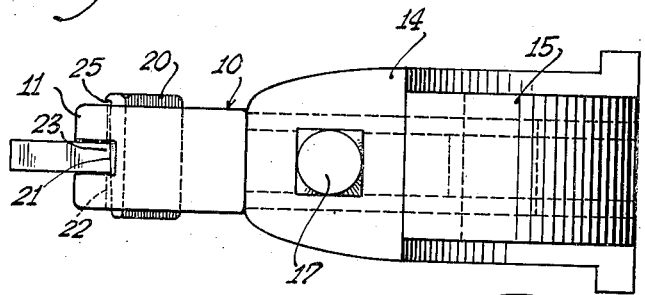
Fig. 1 is an edge view of the invention.
Figure 2:
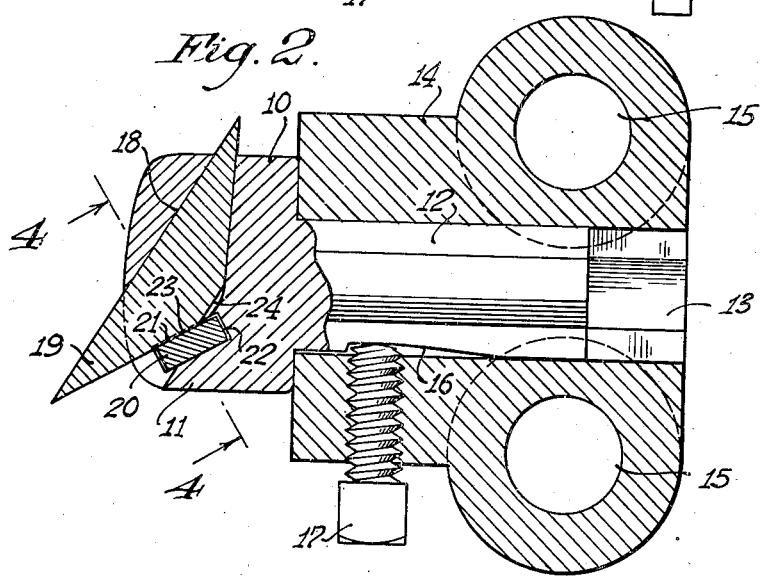
Fig. 2 is a plan sectional detail view of the same.
Figure 3:
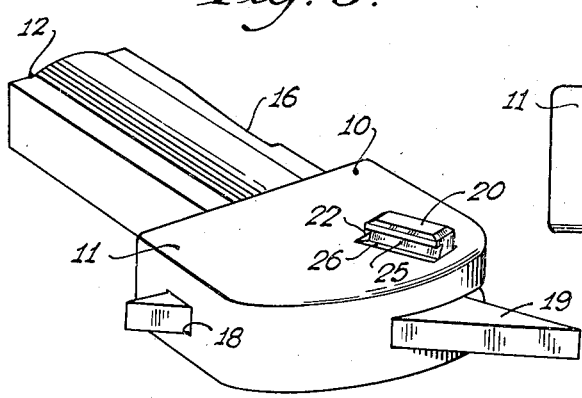
Fig. 3 is a perspective view of the tool holder embodying my invention.

In carrying my invention into effect, I provide a tool holder 10 comprising a head 11 and a shank 12. This shank 12 is adapted to be slidably received in a socket 13 formed in a chuck 14 having the usual eyelets 15 whereby a number of the chucks may be attached together in chain formation in a manner and for the purposes well known in the art.

This shank 12 is provided with a tapering recess 16 into which is projected a set screw 17 threaded into the chuck 14. The arrangement is such that by partial withdrawal or loosening of the set screw 17, the tool holder 10 may be moved a predetermined distance from its innermost position with respect to the chuck 14.

The head 11 is provided with a tool receiving socket 18 adapted to receive a tool 19 which in the present instance is in the form of a cutter bit. The tool socket 18 and cutter bit 19, in the preferred form of construction as illustrated in the drawing, each have a substantially triangular configuration whereby the cutter bit 19, when inserted in the head 10, is inserted into the tool socket and withdrawn therefrom in the same direction.

Figure 4:
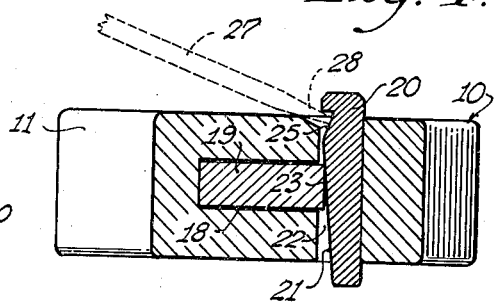
Fig. 4 is a sectional detail view of the same taken substantially on line 4—4 of Fig. 2.

Means is provided for releasably wedging the cutter bit 19 in the socket 18, and this means provides a transversely slidably mounted wedge 20 having one side wall 21 thereof tapered for wedging action within the slot 22, within which it is positioned, and against the adjacent edge 23 of the cutter bit 19, the point of contact for strengthening purposes being substantially adjacent the apex 24 of the cutter bit 19. The wedge 20 is provided with an undercut portion 25, and adjacent this undercut portion 25, when the wedge is mounted in the wedging position as shown in Fig. 4, the edge of the slot 22 adjacent thereto is substantially beveled as at 26, so that an instrument 27, such as a screwdriver or the like, may have its tip 28 projected into the undercut 25 to force the withdrawal of the wedge 20, the beveled edge 26 serving as a point of leverage for the tool 27 for this operation.

In this construction, it may be seen that the cutter bit may be removed from the head 11 without removing the tool holder 10 from its fixed position with respect to the chuck; that the wedge is so related with respect to the head 11 and the cutter bit 19 that no part of either element is weakened.

This wedging means is substantially simple in construction, and therefore results in economical manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In combination, a tool holder comprising a head having a tool receiving slot of substantially triangular formation in plan view, a cutter bit adapted to be mounted in said slot and being substantially triangular shaped in plan view, said head being provided with a transversely extending opening communicating with the tool slot, a wedge member mounted in said slot and having a beveled edge adapted to wedge against the cutter bit adjacent the apex thereof for wedging the cutter bit in said tool slot.

2. In combination, a tool holder comprising a head having a tool receiving slot of substantially triangular formation in plan view, a cutter bit adapted to be mounted in said slot and being substantially triangular shaped in plan view, said head being provided with a transversely extending opening communicating with the tool slot, a wedge member mounted in said slot and having a beveled edge adapted to wedge against the cutter bit adjacent the apex thereof for wedging the cutter bit in said tool slot.

HENRY M. STEPHENS.